United States Patent [19]

Vamvacas

[11] 4,080,479

[45] Mar. 21, 1978

[54] COATING COMPOSITION COMPRISING METHYL-CELLULOSE AND POLYVINYL ACETATE

[76] Inventor: Nicholas Vamvacas, Leoforos Alexandras No. 192 B, Athens 602, Greece

[21] Appl. No.: 691,228

[22] Filed: Jun. 1, 1976

[51] Int. Cl.$^2$ .................. B32B 13/12; B32B 27/30; C08L 1/28
[52] U.S. Cl. ................................................ 427/387
[58] Field of Search .............. 260/17 R, 8; 427/387, 427/385 C, 385 R, 388 C

[56] References Cited

U.S. PATENT DOCUMENTS

| | | | |
|---|---|---|---|
| 2,500,144 | 3/1950 | Beck | 260/17 |
| 2,508,342 | 5/1950 | Wilsox | 260/17 |
| 2,716,619 | 8/1955 | Jobbins et al. | 427/385 C |
| 2,760,885 | 8/1956 | Larsen | 427/385 C |
| 3,053,692 | 9/1962 | Pocock | 427/388 C |
| 3,303,147 | 2/1967 | Elden | 260/8 |

OTHER PUBLICATIONS

IPCBA. – Apr. 1966, No. 7323 – Barrow, Permanence – Book IV, Polyvinyl Acetate — Bookbindings.

*Primary Examiner*—Edward M. Woodberry
*Attorney, Agent, or Firm*—Bucknam and Archer

[57] ABSTRACT

A method of coating irregular, non-homogeneous surfaces, such as wood, metals, concrete walls, is described which consists of applying onto the surface an aqueous emulsion prepared by mixing an organic adhesive, which may comprise a cellulose compound, and at least one synthetic resin in an aqueous medium. A filler may also be used. The coating composition may be applied by brushing or spraying and is then allowed to dry.

5 Claims, No Drawings

COATING COMPOSITION COMPRISING METHYL-CELLULOSE AND POLYVINYL ACETATE

The present invention is related to the coating of irregular hollow, non-homogenous surfaces or surfaces with diverse shapes or even but not allowing further economical treatment or surfaces of lower value by using hydrophilic matter adhering thereto to make them smooth and allowing thereby further treatment without further complementary treatment.

Prior to the present invention it was known that surfaces of lower value or irregular, hollow, non-homogenous with diverse shapes or even but not allowing further treatment for economical or other reasons for obtaining tradable items, should be coated with other wooden, plastic or metallic surfaces common putty to make them suitable for further treatment and tradable.

As an example of cases whereby the material of the present invention may have full application we mention the following by way of example:

A. Referring to wood : Irregularities or holes due to knots, surfaces of small value as f.i. of the Novopan type and irregularities similar on the vertical section as well as on the surface, clefts of any nature and shape, disfigurations and deviations of surfaces etc.

B. Referring to metals : In every case where common putty is used to complete or form surfaces, etc.

C. Referring to mixed surfaces : Whenever one of them can possibly be non porous such as combination of wood and glass (window panes), wood and formica, wood and polyesters, wood and metals, wood and plastics.

D. Referring to walls : made of various concretes in every case where plaster is used to cover or give the convenient form to surfaces.

The object of the present invention is to coat the aforesaid surfaces with a material readily, quickly and economically. Besides this, the coating according to the invention may be perfect from a technological point of view. The adhering of the material on the surfaces is absolute. When knocked the coating material does not get detached or crack. By inserting nails or by opening holes cracking of the coating does not occur. It does not deteriorate through aging. The material is not inflammable and heat does not influence or cause removal of the coating. Further more of the material may become glued together with the same material if there is need of recoating. The material in case it is adjacent to a material of different orgin as f.i. formica or polyester adheres absolutely. The appearance of the spots where the adhesion takes place is of a continuous line which remains imperceptible if dyeing is carried out with a dye. Finally the material is suitable to undergo treatment through any of the classical and special technological processes.

Furthermore seen from a chemical point of view the material does not react with the different constituents of the surfaces with which it gets in contact. Particularly there is no formation of stains and no oxidation or corrosion occurs at the spots of contact of the surface. This material may be dyed and remains in fresh condition unaltered. For a longer period of time it requires a preservative to protect it from mould. The vessels in which the product will be sold may be of any material and their internal surfaces remain intact and absolutely inert as to the product independently of the time of storage.

The material according to the invention can be prepared by different processes. Following is the preferred one : Organic water soluble adhesives are combined with polymerized products deriving from vinyl, acrylic and other resins and a cellulose compound depending on the particular case. As fillings are used : calcium or silicon or magnesium or barium compounds etc. The final product takes the form of an emulsion. To this material a dye may be added if desired as well as dust of small size wood particles depending on the particular case.

The final product is hydrophilic and contains 80% of solid substances this percentage varying according to every particular care and depending on the nature of the adhesive substances which may be used and the nature of the surface which will get coated. It has chemical and mechanical constancy which allows not only absolute adhesion but also easy handling.

The coating is easy and technically it can be effected with the aid of any means (spatula, brush, sprayer etc). Smoothing of the fresh surface of the coating is effected after it is very through the use of common rubbing devices or other known processes in the art.

The solidification under the usual ambient conditions is absolute and is achieved readily beginning immediately after the application of the material on the surface. After the drying of the coating the surface is smooth its aspect is shiny and may remain as it is or it may undergo a complementary treatment if desired.

The combination of organic adhesive substances according to the invention with polymerized products, resins or not, such as acrylic, vinyl products etc. in the form of a dispersion, a powder or granules and especially same of polyvinyl oxide and the formation afterwards of an emulsion having dispersed in it calcium, silicon, magnesium, barium etc. compounds gets realized for the first time for the aforesaid purpose through the present invention. Through the material obtained the absolute coating of the aforesaid surfaces is successfully achieved by forming on the surface of a thin or thick smooth layer capable of undergoing any further treatment. Furthermore this layer permits adhesion on it of any other material of a similar of different substance.

The new material because of its low cost, its great capability for the covering of surfaces, its ready drying and its advantages in general provides substantial economical possibilities to the enterprises which are concerned with the coating of surfaces.

The said coating of surfaces is prepared in an aqueous phase under common conditions of ambient temperature through the combination of polyvinylacetate (in the form of a dispersion, a dust or granules), acrylic or other resins with methylcellulose, fishglue or skinglue or other adhesive substances depending on every particular care, as they are met on the market as well as filling substances which usually are calcium salts.

The process of the preparation of the material must impart to the final product the required properties as these have been described. The material is ready for use as soon as it is prepared. The preparation is considered good when the pH value is about 8. Accordingly there occurs a removal from the initial acid phase in the case of polyvinyl acetate towards the basic phase of the new product. The initial pH value of the polyvinyl acetate as well as the final pH value of the mixture are not absolutely determined depending on the use which will be made of the final product to which are adjusted the quantities and the changes in the raw material used.

The more suitable method for the preparation in practice of the new coating, and which is mentioned as an example, is as follows : In a reactor made of stainless steel are introduced the plastic material, polyvinyl acetate or another resin in dispersed condition, as it can be provided from the market, in a proportion of 20% as to the product being manufactured. Follows the addition of the corresponding quantity of water which is approximately 15%. In one part of the water to be added is dissolved separately the corresponding quantity of adhesive material, and in the present example the fish- or skinglue, in a proportion of 1% and in another part of the same quantity of water is dissolved the corresponding quantity of methylcellulose in a proportion of approximately 1%, if its presence is necessary, depending on each case. The dissolving of fishglue and methylcellulose is effected readily with the aid of heat depending on each case. The solution of fishglue and methylcellulose is introduced into the reactor whereafter the whole mixture is stirred. Upon completion of the homogenization which does not require a long period of stirring, follows the introduction of the calcium carbonate up to a percentage of 70% and the stirring is resumed till obtention of a complete emulsioning. The coating is then considered ready for use.

As the homogenization of the final product has to be absolute all the special technical processes are used. Similarly as the types of polyvinyl acetate provided from the market may be different and every one is used for a certain special purpose, for the preparation of the material of the present invention, a selection has to be made of the type suitable for the use which will be made of the product getting manufactured. The proportions of the ingredients may vary, according to the table below:

Permissible proportions by weight of the ingredients:

| | |
|---|---|
| synthetic resin | 5–40% |
| organic adhesive | up to 10% |
| cellulose compound | up to 5% |
| water | 5–50% |
| mineral filler | 5–75% |

The total amount of solid constituents varies between 50 and 80%. As filler, calcium carbonate, calcium sulfate or cement may be used, in addition to silicon, magnesium or barium compounds.

What is mentioned above does neither exhaust the possible combinations of constituents which in practice enter the sphere of the present invention nor limit the nature and the quantity of the binding and the auxilliary adhesive material which may be used. Furthermore has to be clearly taken into consideration that the upper and lower limits of the aforementioned quantities depend not only on the nature and the properties of the surface which will be coated but also on the quality of the material provided from the market which quality varies sometimes within very wide limits.

I claim:

1. A coating composition which comprises 5–40% of polyvinyl acetate, up to 10% of an organic water soluble adhesive which comprises up to 5% of methyl-cellulose, 5–50% water, a mineral filler in the proportion of 5–75%, the total amount of solid constituents being 50–80%.

2. The composition according to claim 1 additionally comprising a dye.

3. The composition according to claim 1 wherein the mineral filler is calcium carbonate, calcium sulfate, or concrete.

4. The composition according to claim 1 wherein the proportion of the polyvinyl acetate is approximately 15%.

5. The method of coating a surface which comprises forming a composition which comprises 5–40% of polyvinyl acetate, up to 10% of an organic water soluble adhesive which comprises up to 10% of methyl cellulose, 5–50% water, a mineral filler in the proportion of 5–75%, the total amount of solid constituents being 50–80%, as an aqueous emulsion and applying the emulsion onto the surface and allowing drying to occur.

* * * * *